J. AND H. TRUST.
FOOD MACHINE.
APPLICATION FILED AUG. 22, 1919.
1,418,749.
Patented June 6, 1922.
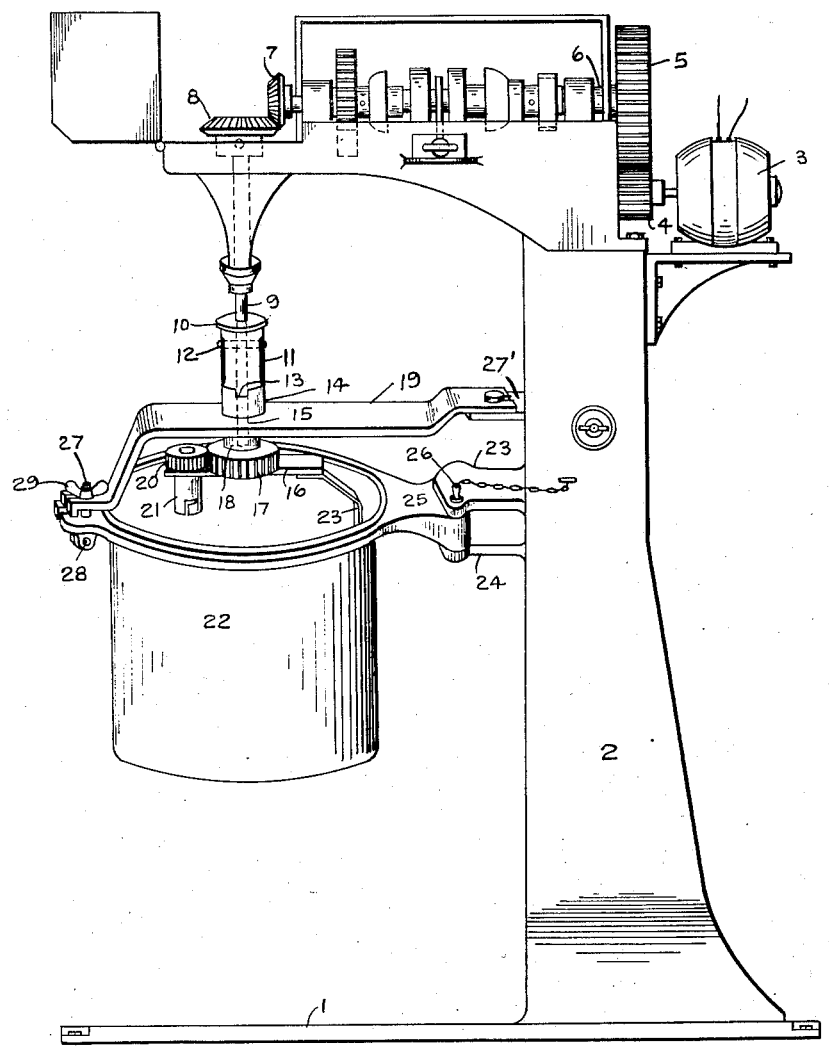
INVENTOR
Josephine Trust
Henry Trust.
BY
ATTORNEY

UNITED STATES PATENT OFFICE.

JOSEPHINE TRUST AND HENRY TRUST, OF PARK RIDGE, NEW JERSEY, ASSIGNORS, BY MESNE ASSIGNMENTS, TO METEOR MIXING MACHINE CO., INC., A CORPORATION OF NEW YORK.

FOOD MACHINE.

1,418,749.  Specification of Letters Patent.  Patented June 6, 1922.

Application filed August 22, 1919. Serial No. 319,052.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Food Machines, of which the following is a specification, reference being had therein to the accompanying drawing.

Our invention relates to improvements in food machines such as are adapted for use in mixing, beating, whipping, mashing and otherwise treating food products such as vegetables and more particularly has reference to means and combination of such a machine for introducing and removing the particular tool which is to be used without the necessity for removing the container in which the operation is performed.

Referring to the accompanying drawings, 1 indicates the base or platform of the machine, 2 the standard thereof and 3 the motor for driving the same provided with a pinion 4 meshing with the gear 5 upon which the spindle 6 at the opposite end of which is provided the beveled pinion 7 meshing with the beveled gear 8 upon the spindle 9 provided with a sleeve 10 having a cut away portion 11 through which projects the pin 12 the lower end of said sleeve 10 being provided with a depending portion 13 which engages the interlocking member 14 which has a depending spindle 15 secured to the bracket 16. 17 indicates the gear provided with a shank 18 which is secured to the bracket 19 and the bracket 16 is provided with a pinion 20 rotatable thereupon and provided with a chuck 21 for the tool which is to operate within the container 22. At the opposite end of the bracket 16 is a scraper 23 adapted to whirl adjacent the inside of the can to remove any food particles adhering thereto.

23—24 are brackets from the standard 2 adapted to receive the bracket 25 which may be secured therein by any suitable means such as the pin 26, bracket 25 serving as a support for the can 22. 27' indicates another bracket from the standard 2 or supporting bracket 19 which is forked at opposite ends as shown, bracket 25 being also forked at the outer end and provided with a bolt 27 hinged at 28 and having a wing nut 29 for retaining the brackets 19—25 in locked position when in use.

From the foregoing it will be understood that the spindle 9 when locked to the spindle 15 as shown in the drawing rotates the bar 16 carrying the scraper 23 and pinion 20 so that the tool in the chuck 21 whirls about the interior of the can opposite the scraper 23 while at the same time said tool rotates upon its own axis thus producing a planetary motion. For disconnecting the tool it is only necessary to raise the sleeve 11 and disconnect the bracket 19 by loosening the wing nut 27 when said bracket and the tool can be completely removed without disturbing the can or its contents.

Of course, it will be understood that various modifications may be made in the construction and arrangement of parts without departing from the spirit of the invention as claimed.

We claim:

1. In a machine of the class described, a swinging bracket for carrying a container and having a hinged bolt at the outer end and provided with a wing-nut, another swinging bracket above the same adapted to carry a tool and provided with a kerfed end into which said hinged bolt may pass so that said wing-nut may be turned down binding said brackets in position.

2. In a machine of the class described, having a standard and a container, and in combination with the chuck thereof, a bridge member provided with a tool support and transmission therefrom including an interlocking member adapted to engage said chuck, said bridge being adapted to be detachably secured at one end to the standard of said machine and at the opposite end to the support for the container thereof.

In testimony whereof we hereunto affix our signatures in the presence of two witnesses.

JOSEPHINE TRUST.
HENRY TRUST.

Witnesses:
MADELINE C. FOERST,
DAVID H. DOUGLASS.